United States Patent
Boys et al.

(10) Patent No.: US 10,276,899 B2
(45) Date of Patent: Apr. 30, 2019

(54) INDUCTIVE POWER TRANSFER APPARATUS AND ELECTRIC AUTOCYCLE CHARGER INCLUDING THE INDUCTIVE POWER TRANSFER APPARATUS

(75) Inventors: John Talbot Boys, Auckland (NZ); Grant Anthony Covic, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 866 days.

(21) Appl. No.: 13/261,001

(22) PCT Filed: May 12, 2010

(86) PCT No.: PCT/NZ2010/000088
§ 371 (c)(1),
(2), (4) Date: Jan. 26, 2012

(87) PCT Pub. No.: WO2010/131983
PCT Pub. Date: Nov. 18, 2010

(65) Prior Publication Data
US 2012/0119697 A1    May 17, 2012

(30) Foreign Application Priority Data
May 12, 2009    (NZ) ........................................ 576909

(51) Int. Cl.
*H02J 7/00*        (2006.01)
*H01M 10/46*    (2006.01)
(Continued)

(52) U.S. Cl.
CPC ........... *H01M 10/46* (2013.01); *B60L 11/182* (2013.01); *B62H 3/00* (2013.01); *B62M 6/40* (2013.01);
(Continued)

(58) Field of Classification Search
USPC ........................................................... 320/108
See application file for complete search history.

(56) References Cited

U.S. PATENT DOCUMENTS 5,457,378 A    10/1995   Woody
5,594,318 A *  1/1997   Nor et al. ..................... 320/108
(Continued)

FOREIGN PATENT DOCUMENTS

CN    1092858    10/2002
CN    1950914    4/2007
(Continued)

OTHER PUBLICATIONS

Office Action in corresponding Chinese Application 201080031336.4.
(Continued)

*Primary Examiner* — Robert Grant
(74) *Attorney, Agent, or Firm* — Law Office of Richard F. Jaworski, PC

(57) ABSTRACT

The invention provides an electric autocycle support apparatus comprising an autocycle engagement device adapted to support an autocycle, the engagement device having a coil adapted to provide a magnetic field for inductively charging an autocycle supported by the apparatus. The invention also provides an electric autocycle stand and a charging system.

27 Claims, 7 Drawing Sheets

(51) Int. Cl.
  *B60L 11/18* (2006.01)
  *B62H 3/00* (2006.01)
  *B62M 6/40* (2010.01)
  *H01Q 7/06* (2006.01)
  *H01Q 7/08* (2006.01)

(52) U.S. Cl.
  CPC .............. *H01Q 7/06* (2013.01); *H01Q 7/08* (2013.01); *B60L 2200/12* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 5,646,500 | A | 7/1997 | Wilson |
| 6,104,169 | A | 8/2000 | Radys et al. |
| 6,150,794 | A * | 11/2000 | Yamada et al. ............ 320/108 |
| 6,265,851 | B1 | 7/2001 | Brien et al. |
| 6,317,338 | B1 | 11/2001 | Boys |
| 7,495,414 | B2 * | 2/2009 | Hui .................. H01F 38/14 320/108 |
| 7,675,197 | B2 | 3/2010 | Tetlow |
| 8,008,888 | B2 | 8/2011 | Oyobe et al. |
| 2002/0110013 | A1 | 8/2002 | Park et al. |
| 2004/0041025 | A1 | 3/2004 | Fukushima et al. |
| 2005/0125093 | A1 | 6/2005 | Kikuchi et al. |
| 2008/0278264 | A1 | 11/2008 | Karalis et al. |
| 2009/0085408 | A1 | 4/2009 | Bruhn |
| 2009/0289505 | A1 | 11/2009 | Baumann et al. |
| 2010/0225271 | A1 | 9/2010 | Oyobe et al. |
| 2010/0289340 | A1 | 11/2010 | Boys et al. |

FOREIGN PATENT DOCUMENTS

| | | |
|---|---|---|
| EP | 0741441 | 11/1996 |
| EP | 1779752 | 5/2007 |
| JP | 1996308022 | 11/1996 |
| JP | H11503599 | 3/1999 |
| JP | H11187583 | 7/1999 |
| JP | H11275712 | 10/1999 |
| JP | 2001119814 | 4/2001 |
| JP | 2002508916 | 3/2002 |
| JP | 2002262468 | 9/2002 |
| JP | 200429873 | 1/2004 |
| JP | 2005110131 | 4/2005 |
| WO | 9323908 | 11/1993 |
| WO | WO9850993 | 11/1998 |
| WO | WO2005124962 | 12/2005 |
| WO | WO2006118474 | 11/2006 |
| WO | WO2008035248 | 3/2008 |
| WO | 2009054221 | 4/2009 |
| WO | WO2009054221 | 4/2009 |

OTHER PUBLICATIONS

Notification of Reasons of Rejections from corresponding Japanese application dated Mar. 25, 2014 (Japanese and English translation).

* cited by examiner

INDUCTIVE POWER TRANSFER APPARATUS AND ELECTRIC AUTOCYCLE CHARGER INCLUDING THE INDUCTIVE POWER TRANSFER APPARATUS

The present application is based on and claims the benefit of International Application Number PCT/NZ2010/000088 filed on May 12, 2010, which claims priority from New Zealand Application 576909 filed May 12, 2009 and the entire contents of each of which are herein incorporated by reference.

TECHNICAL FIELD

The present invention relates to systems and apparatus for charging electrically powered vehicles, in particular, but not exclusively, electrically assisted bicycles and electric scooters.

BACKGROUND ART

Electric bicycles are seeing an increased uptake in Asia and Europe, but suffer from the fact that the battery forms a significant part of the weight of the bike. To charge the battery the user normally must plug in a conventional (typically 50-80 W) charger to the mains power supply. However, if the bike needs to be stored externally, such as at work or at a "park and ride" facility in a city, the charger needs weather proofing and isolation for safety for outdoors use. Further, it requires means to ensure it is safely secured from damage or accidental disconnect. The plugs used in such systems have a significant failure risk with use over time.

An alternative means of charging the battery is to remove it from the bike and take it to a charger inside a building. However, for the elderly (who can benefit the most from such powered assistance) the weight is prohibitive. Managed park and ride systems could potentially store an assortment of batteries and replace each battery when a bike is returned or "dropped off" from another station once the state of charge of a battery indicates that it requires charge/replacement, but there are significant problems with this model. Foremost of these is the need to have sufficient battery packs held on site, but additionally a range of charging stations suited to each available battery make and type will be required.

Any method of charging a battery without removing it from the vehicle should be safe and easy to use. One method which has previously been proposed is the use of an inductive power transfer (hereinafter referred to as IPT) system to transfer power from a charging station to a receiver mounted on the vehicle, for example at the end of a kick-stand. IPT can be used to provide a safe means of power transfer, as the danger associated with exposed live electrical contacts is eliminated. However, an IPT system should be efficient, and not create excessive electromagnetic interference. Stray magnetic fields can still be an issue, for example European field regulations of 6.25 uT have been suggested by ICNIRP.

The term "electric autocycle" is used herein to describe any two wheeled vehicle which is provided with an electric energy storage device. Such vehicles will usually, but not necessarily, be provided with an electric motor for the purposes of motive force, whether primary or supplementary, and includes electrically assisted bicycles and electric or hybrid scooters and motorcycles.

OBJECT OF THE INVENTION

It is an object of a preferred embodiment of the invention to overcome or ameliorate problems with known constructions or methods, or at least provide the public with a useful choice.

Other objects of the present invention may become apparent from the following description, which is given by way of example only.

SUMMARY OF THE INVENTION

Accordingly in one aspect the invention provides electric autocycle support apparatus comprising an autocycle engagement device adapted to support an autocycle, the engagement device having a coil adapted to provide a magnetic field for inductively charging an autocycle supported by the apparatus.

The support apparatus may comprise a support portion and an engagement portion removably attached to the support portion, the engagement device being provided on the engagement portion.

In another embodiment the support apparatus is moveable between a first position in which the engagement device is not oriented to support an autocycle and a second position in which the engagement device is oriented to support an autocycle. When the support apparatus is in the first position the coil may not provide a magnetic field for inductive charging.

Preferably the coil does not provide a magnetic field for inductive charging when an autocycle is not supported by the apparatus.

Preferably the coil comprises part of a resonant circuit which is adapted to receive power inductively from a power supply.

In one embodiment the resonant circuit includes a switch to selectively decouple the resonant circuit from the power supply.

In another aspect the invention provides an electric autocycle stand comprising a plurality of inductive charging coils, each coil being adapted to provide a magnetic field to inductively charge an electric autocycle, each charging coil being connected to a resonant circuit that receives power inductively whereby each resonant circuit may be selectively decoupled such that the coil to which the resonant circuit is connected does not provide a magnetic field for inductive charging.

In one embodiment the coil does not provide a magnetic field for inductive charging when an autocycle is not in proximity for charging by the apparatus.

Preferably the resonant circuit includes a switch to selectively decouple the resonant circuit from the power supply.

Preferably each coil is provided in association with an autocycle engagement device adapted to support an autocycle.

In another aspect the invention provides an electric autocycle charging system comprising a resonant circuit having a coil adapted to provide a magnetic field to inductively charge an electric autocycle, and a primary conductor adapted to provide power inductively to the resonant circuit.

Preferably a plurality of resonant circuits are provided, each resonant circuit being supplied with power inductively from the primary conductor.

Preferably the coil does not provide a magnetic field for inductive charging when an autocycle is not in proximity for charging by the system.

Preferably the resonant circuit includes a switch to selectively decouple the resonant circuit from the power supply.

In one embodiment each coil is provided in association with an autocycle engagement device adapted to support an autocycle.

According to a further aspect of the present invention there is provided an inductive power transfer system including a first member rotatably connectable to a second member, the first member provided with a primary conductive path connectable to a power source for providing alternating current to the primary conductive path, the primary conductive path in use supplying electrical energy, the second member including a secondary coil provided about a magnetically permeable core, wherein the first and second members are rotatable to a first relative position in which the secondary coil in use receives electrical energy from the primary conductive path through inductive coupling; and the first and second members are rotatable to a second relative position in which the secondary coil substantially does not receive electrical energy from the primary conductive path through inductive coupling.

Preferably the second member includes a further primary conductive path to provide a field capable of being intercepted by an IPT pick-up.

According to a further aspect of the present invention there is provided an electric autocycle with an IPT pick-up associated with a part of the frame of the autocycle.

Further aspects of the invention, which should be considered in all its novel aspects, will become apparent from the following description, given by way of example, of possible embodiments of the invention.

BRIEF DESCRIPTION OF THE DRAWINGS

FIG. 2b Is a diagrammatic side elevation of the arrangement of FIG. 2a.

BRIEF DESCRIPTION OF PREFERRED EMBODIMENTS OF THE INVENTION

Figure 1A:
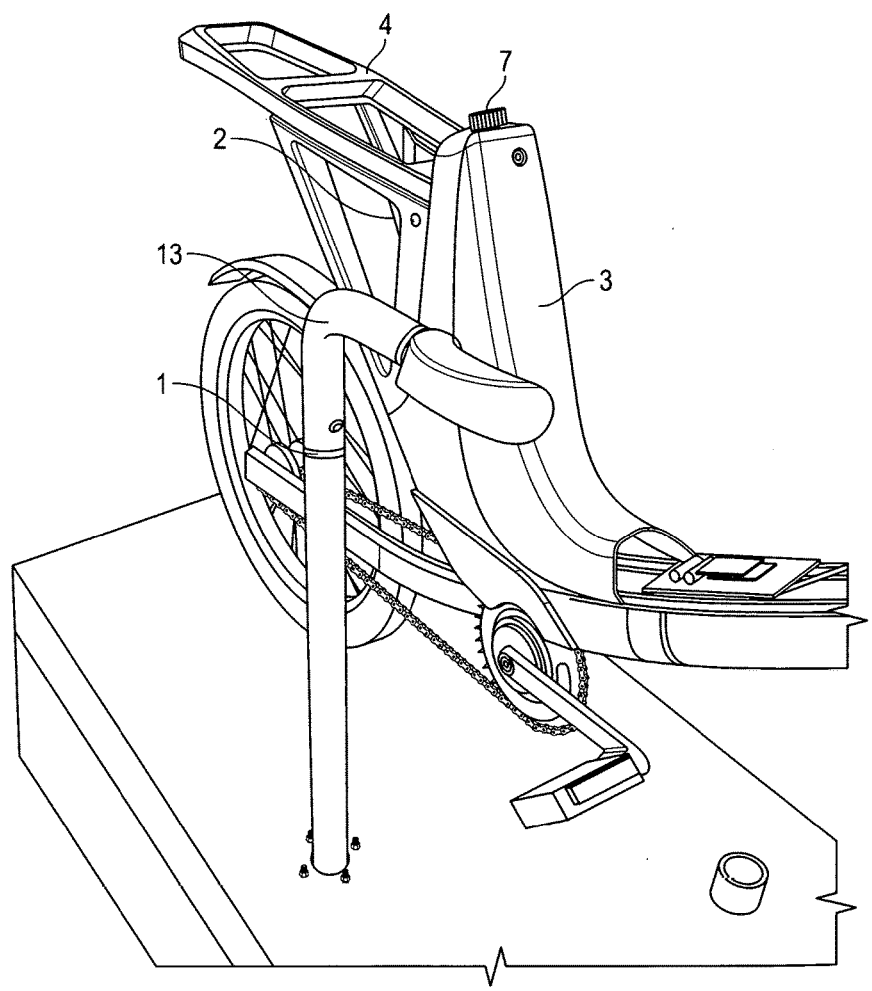
FIG. 1a Is a front perspective view of an electric autocycle charging apparatus of the present invention, with the engagement means in a non-charging position.
Figure 1B:
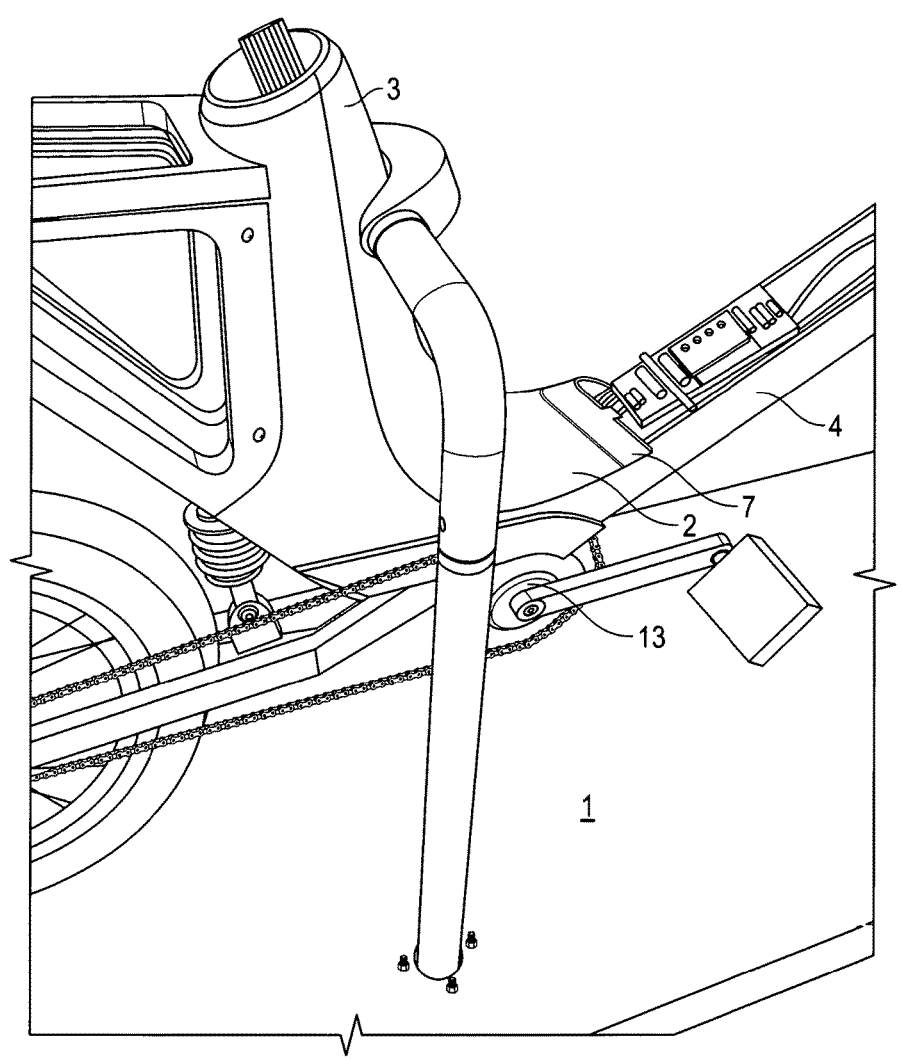
FIG. 1b Is a side perspective view an electric autocycle charging apparatus of the present invention, with the engagement means engaged with the electric autocycle.

Referring first to FIGS. 1a and 1b, an electric autocycle charging apparatus is shown. In FIG. 1a the apparatus is disposed adjacent to an electric autocycle 4 in a non-charging position. In FIG. 1b the charging apparatus is engaged with the autocycle in a position in which the autocycle is being charged and being supported by the apparatus. The charging apparatus includes a support portion 1 which is stationary, for example a post comprising part of a cycle stand, or being attached to a cycle stand. Alternatively, the support portion 1 may simply be a post that is fixed to a ground or wall surface for example. An engagement portion 2 is connected to the support portion 1. Thus the support portion 1 may be connected to the ground by any suitable means, either directly or indirectly, such that the support portion is able to hold the engaging portion 2 in a required position. A joint 13 is provided between the support portion 1 and the engagement portion 2. The joint 13 may take a variety of forms. In the example illustrated in FIG. 1a and FIG. 1b joint 13 allows the engagement portion 2 to rotate relative to support portion 1. In this manner the engagement portion can be rotated between the positions shown in FIGS. 1a and 1b.

In the embodiment illustrated, the engagement portion 2 includes an engagement device 3 which is adapted to releasably engage a suitably shaped portion of the electric autocycle 4 when in use, to thereby hold the autocycle 4 in a substantially upright position.

Figure 1C:
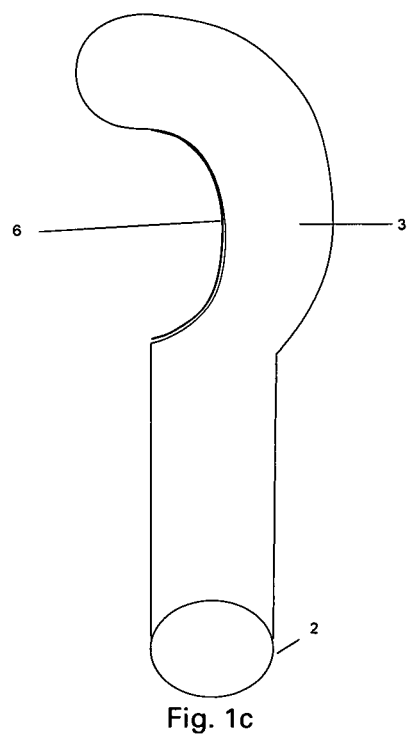
FIG. 1c Is a plan view of the electric autocycle charging apparatus of FIG. 1.

In the embodiment shown, the engagement device 3, as best seen in FIGS. 1b and 1c, is provided with a substantially arcuate concave exterior surface 6 which engages a complimentary surface 7 of a frame of the electric autocycle 4. Thus the charging apparatus described and illustrated with reference to FIGS. 1a, 1b and 1c provides a stand which physically supports the autocycle as well as providing a charging facility (as discussed below).

In another embodiment, the engagement device 3 may be replaced by a device that provides a charging facility but does not physically support the autocycle.

Figure 2:
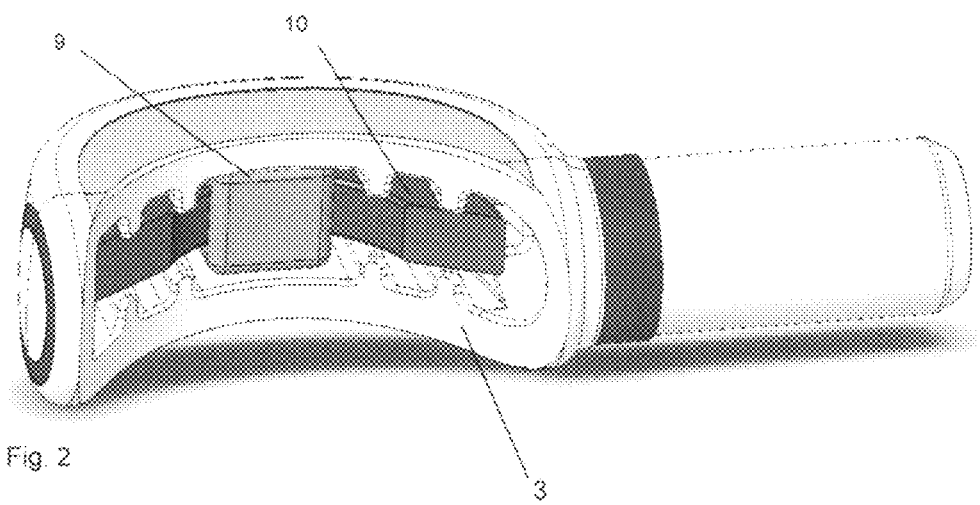
FIG. 2 A side perspective view of the engagement means, with the front exterior surface removed.

Referring next to FIG. 2 the engagement device 3 is shown in greater detail. In this embodiment the engagement device 3 includes a coil 9 associated with a magnetically permeable core 10 such that an alternating electrical current in coil 9 causes a magnetic flux to be created which is capable of inducing an electrical current in a suitably positioned power pick-up coil provided on the autocycle. This enables power to be transferred inductively for charging the autocycle, as will be described further below. In the embodiment shown the pick-up coil and an associated magnetically permeable core are positioned behind the complementary surface 7 on the frame of the electric autocycle 4, so as to be proximate to the coil 9 and core 10 of the engagement device 3.

In one embodiment the core 10 is substantially semi toroidal. The coil 9 is preferably wound around the core 10, but in some embodiments may be provided above the magnetically permeable core 10. The magnetically permeable core associated with the pick-up coil on the autocycle 4 is also preferably semi-toroidal in this embodiment. Thus the core 10 and the core on the autocycle are shaped and dimensioned such that together they form a substantially complete toroid having a gap between the adjacent core parts i.e. the first and second parts are loosely coupled.

Figure 2A:
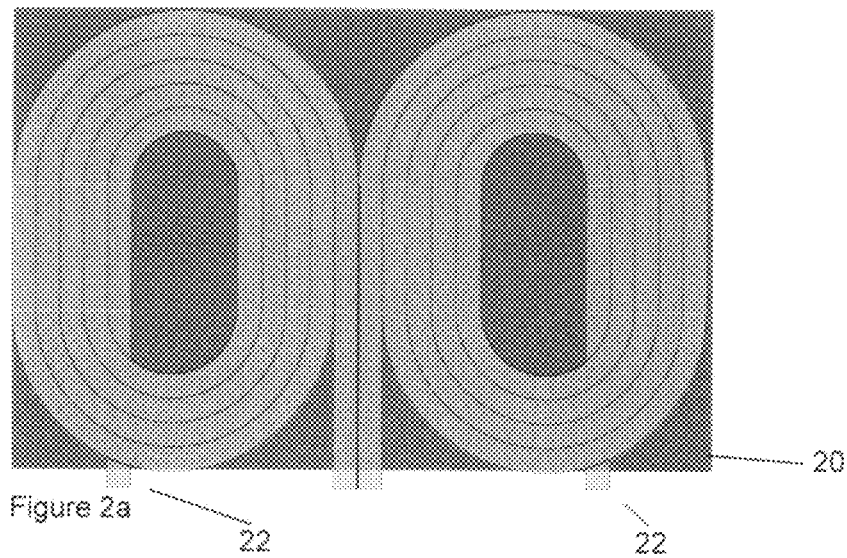
FIG. 2a Is a diagrammatic plan view of an embodiment of an IPT flux pad arrangement.
Figure 2B:
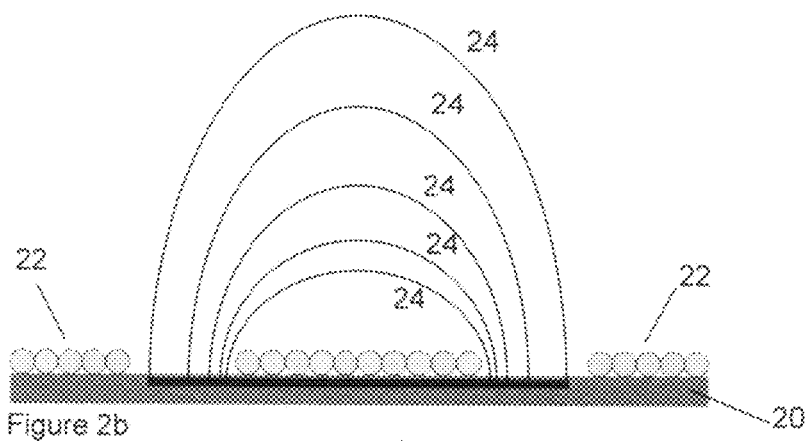

In another embodiment the coil 9 and core 10, and the pick-up coil and core provided on the autocycle are each replaced with the magnetic flux pad construction shown in FIGS. 2a and 2b. Referring to those figures the flux pad comprises a backing member 20 as shown in FIGS. 2a and 2b which supports two coils 22 that generate magnetic flux as indicated by lines 24. The coils 22 are provided on one side of the backing member and are essentially flat or planar. Backing member 20 includes (or is associated with) a material having a high magnetic permeability, for example ferrite. This arrangement has the advantage that substantially all the magnetic flux is projected out away from the backing member on the side of the backing member on which the coils 22 are located.

Figure 2C:
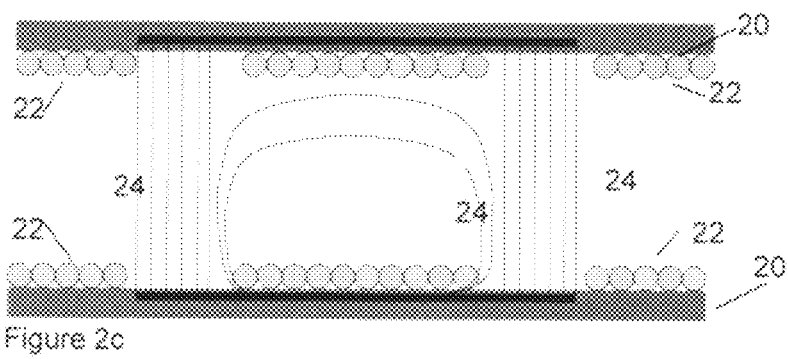
FIG. 2c Is a diagrammatic side elevation of two flux pads according to the arrangement of FIG. 2a provided such that flux linkage between the pads occurs.

The flux pad described with reference to FIGS. 2a and 2b may be provided as a flux transmitter on the engagement device 3, and another pad may be provided as the flux receiver (i.e. the power pick-up) on the autocycle. FIG. 2c shows two flux pads located adjacent to each other and the flux lines 24 between the pads. In FIG. 2c the lower pad is the flux transmitter, which is located on engagement device 3 and the upper pad is the receiver which is located on the autocycle. The flux pads may be provided in a purely planar form as illustrated in FIG. 2c, or alternatively may be curved. Thus the flux transmitter pad is contoured to conform with the concave surface 6 of the engagement device 3, and the flux receiver pad may be contoured to conform to a rear surface of surface 7 of the autocycle.

Figure 3:
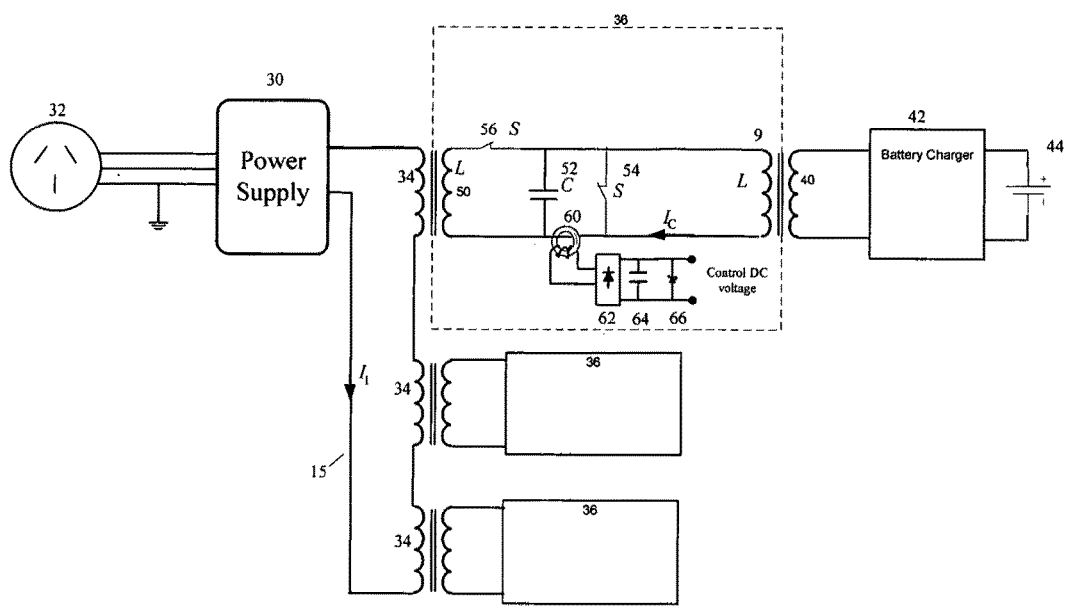
FIG. 3 Is a schematic circuit diagram of an IPT system according to one embodiment of the invention.

Referring next to FIG. 3, a schematic circuit diagram of the charging system is illustrated. A power supply 30 is connected to a mains power supply 32 and establishes a current at VLF frequencies (10-100 kHz) in primary conductor 15. In the embodiment shown, supply 32 is a single phase mains supply as this is most readily available in suburban environments. One or more nodes 34 are provided in the primary conductor. These may simply comprise areas at which the field created by the primary conductor is readily accessible, but may also comprise a number of turns of the primary conductor (as illustrated) to provide regions in which the field is enhanced. In a practical embodiment the primary conductor 15 may be provided in the ground beneath a cycle stand or within a cycle stand, with the nodes being present in or adjacent to each support portion 1. In some embodiments only a single node may be provided. In other embodiments a plurality of nodes may be provided to enable a number of autocycles to be charged simultaneously. For example, a 1 kW supply could easily provide sufficient power to charge 10 electric autocycles simultaneously.

Still referring to FIG. 3, the power pick-up coil of an autocycle charged by the system is shown referenced 40. As described above with reference to FIGS. 2a-2c, coil 40 may comprise coils 22. Power transferred to pick-up coil 40 is provided to battery charging control circuit 42 which charges the autocycle battery 44. An intermediate resonant circuit 36 is provided between each node 34 and pick-up coil 40. In one embodiment circuit 36 is located in the engagement portion 2 (refer to FIGS. 1a and 1b) of the charging apparatus. Circuit 36 includes a coil 50 which receives power from the associated node 34. Thus the node may in use be provided in portion 1 of the charging apparatus at or adjacent to the joint 13, and coil 50 may be provided at or adjacent to the base of portion 2 of the charging apparatus adjacent to joint 13 so that inductive power transfer can occur. A tuning capacitor 52 is provided to tune the intermediate resonant circuit 36 to be resonant at the frequency of the IPT charging supply. Although shown as being connected in parallel with the coil 50, the tuning capacitor 52 may in other embodiments be connected in series with coils 50 and 9. Coil 9, as described above, makes a magnetic field available to the pick-up coil 40. Also, as described above, coil 9 may instead comprise coils 22 according to the embodiment of FIGS. 2a-2c.

In one embodiment the reactance of the coil 50, the tuning capacitor 52 and coil 9 will all be identical. In operation the system of this embodiment acts as an LCL tuned circuit so that the coupled voltage from coil 50 can be designed to set the required current in coil 9.

Placement of the intermediate resonant circuit 36 in arm portion 2 of the charging apparatus has the advantage that the arm portion 2 is easily removed and replaced as required. For example in the event of failure, or to accommodate different types of autocycle, or autocycles with different charging requirements.

In the embodiment illustrated in FIG. 3 there is also the advantage that power can be made available selectively to coil 9. Therefore the charging apparatus can be provided such that a single power supply 30 is connected to a plurality of nodes 34, and magnetic field is selectively provided from coil 9 when the engagement device 3 is suitably positioned relative to a pick-up coil 40 i.e. magnetic field is not radiated or available from unused apparatus.

In the embodiment of FIG. 3, the intermediate resonant circuit 36 may be effectively shorted out electronically to thereby decouple the circuit to prevent any field being emitted by coil 9. Electronic shorting may be performed by either closing a switch 54 or opening a switch 56. One or both of these switches may be provided. Thus in use switch 54 is normally closed and switch 56 is normally open. The switches are controlled to change from their normal state either by control means (a communication link) or on detection of load current when the electric autocycle is present awaiting charge. Power for this control can be achieved using a secondary current transformer 60 with rectifying means 62, capacitor 64 and diode clamp 66.

In another embodiment one or both of the switches 54 or 56 may be manually actuated to allow coupling or decoupling to occur. In another embodiment magnetic shorting means may be provided adjacent to the node 34 or the coil 9—for example being arranged in a similar manner to the jaws of a clamp. Such a magnetic short may be loosely coupled so that it adds little to the overall inductance seen by the power supply 30 so that the incremental change in inductance is small and easily handled by the power supply 30 when the magnetic short is opened and closed. In one embodiment the magnetic shorting means may comprise a suitable cap that is placed over the end of the support portion 1 (when portion 2 is removed), or a cap that is placed over the engagement device 3.

In an alternative embodiment the engagement device 3 may be provided with clamping means which extend around a suitable portion of the electric autocycle 4. One or both of the switches 54 or 56 may be actuated to couple the power supply 30 to the engagement device 3 when the clamping means are moved to a closed position. When the clamping means are extended around the autocycle and closed, flux is redirected into the pick-up coil 40 of the autocycle.

In some embodiments the engagement device 3 may be magnetically attached to the electric autocycle 4, for example by means of a magnet provided within the engagement device.

Figure 4A:
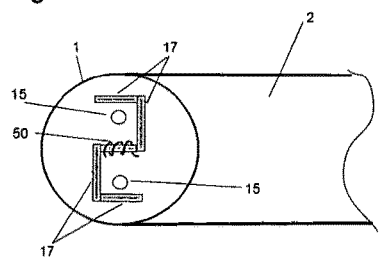
FIG. 4a Is a horizontal cross section of the rotatable connection between the support portion and the engaging portion of the electric autocycle charging apparatus of FIG. 1, with the engaging portion in an engaged position.

In another embodiment the support portion 1 is rotatably coupled to the engaging portion 2 as shown in FIGS. 1a and 1b, and rotation between a position suitable for charging and an inactive position may be used to couple or decouple the intermediate circuit 36 to or from the power supply. As described above, power may be transferred across the joint 13 via appropriate magnetic coupling node 34 and coil 50. In one embodiment, shown in FIGS. 4a and 4b, the node 34 may include a simple loop of the primary conductor 15, and coil 50 is provided around an asymmetric magnetically permeable core, preferably a substantially S shaped core 17, such as is described in International Publication No. WO2006/118474. In one embodiment the substantially S shaped core 17 may be connected to the engagement portion 2, and the primary conductor 15 may be connected the support portion 1. The components of are arranged such that when the engaging portion 2 is rotated to an engagement position, shown in FIG. 4a, the core 17 is in a position which is effective in transferring power from the node 34 to the coil 50. However, rotation of the engagement portion 2 away from the engagement position, for example to allow the electric autocycle to be removed from the stand, rotates the core 17 to a position in which it is no longer effective in transferring power.

Figure 4B:
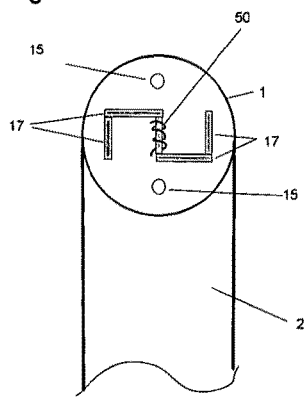
FIG. 4b Is a horizontal cross section of the rotatable connection between the support portion and the engaging portion, with the engaging portion in a disengaged position.
Figure 4C:
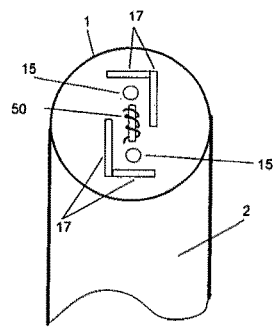
FIG. 4c Depicts a horizontal cross section of the rotatable connection between the support portion and the engaging portion of the electric autocycle apparatus.

In an alternative embodiment, rather than relative rotation between the core 17 and conductor 15 to decouple the apparatus from power supply 30, rotation may occur between the central leg of the core 17 and the remainder of the core i.e. the central leg on which coil or winding 50 is disposed may be rotated to the position shown in FIG. 4b while the remainder of the core remains in the position shown in FIG. 4c. In this way the remainder of the core remains part of the inductance of the primary conductive pathway. The central leg of the core can in one embodiment be removed if required with engaging portion 2 allowing a new portion 2 to be fitted for a different autocyle with just a central leg and coil 50.

In some embodiments the engaging portion 2 may be removable from the support portion 1. This allows the user to select an engaging portion 2 to suit a particular electric autocycle. Use of an intermediate circuit 36 between the support portion 1 and the engaging portion 2 is useful to simplify this operation as it eliminates the need to connect the portions 1,2 by means of electrical connectors.

In a preferred embodiment the engaging portion 2 may be a substantially rigid arm, as shown in the Figures. However, in alternative embodiments the engaging portion 2 may be configured such that it can be plastically deformed into a suitable shape, or it may be flexible.

In yet a further embodiment the node 34 and the coil 50 may each comprise a flux pad as described with reference to FIGS. 2a and 2b. Thus when portions 1 and 2 are rotated into the operative position, the pads are aligned as shown in FIG. 2c, so that power transfer occurs. However, when the portions 1 and 2 are rotated 90 degrees to the inoperative position there is substantially no flux coupled between the pads so power transfer does not occur. In an embodiment such as this the portions 1 and 2 can be completely sealed from each other so that no ingress of foreign matter such as or water dirt into the apparatus can occur. Thus the portions 1 and 2 simply click into place for use.

Figure 5:
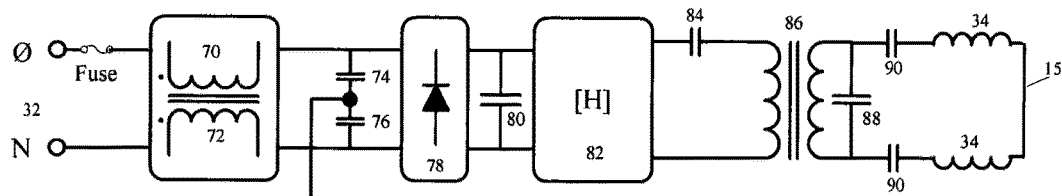
FIG. 5 Is a schematic circuit diagram of a power supply according to one embodiment of the invention.

Referring now to FIG. 5, the power supply 30 is shown in greater detail. The single phase mains input 32 is provided to an RFI filter comprising common-mode choke inductors 70 and 72, and RF filter capacitors 74 and 76. A full wave diode rectifier 78 produces a DC voltage across capacitor 80 which is deliberately kept small to improve the power factor and reduce the stored energy in the power supply. The DC voltage across capacitor 80 is switched to produce a quasi square wave voltage by an H bridge 82 and this square voltage is filtered and isolated by capacitor 84, transformer 86, capacitors 88, and 90 and the attached primary conductor 15 which includes nodes 34. These components form an LCL filter which has good impedance converting characteristics with complete transformer isolation. The transformer is small and low cost as it operates at the VLF operating frequency of 10-100 kHz and not the mains frequency. The primary conductor 15 which in practice comprises an extended loop of wire may have a current in it of 10-20 A at the VLF IPT operating frequency and may be hundreds of meters or even kilometers long. As the length is increased the inductance will also increase and to keep the LCL filter tuned series capacitors 90 will need to be added as required.

Figure 6:
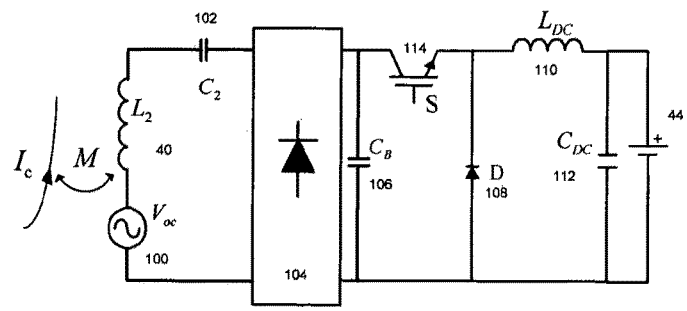
FIG. 6 Is a schematic circuit diagram of a battery charging controller according to one embodiment of the invention.

Power and decoupling control on the receiver side is undertaken by the battery charger as required for each battery load and type. Referring next to FIG. 6, a suitable power receiving circuit and charging controller 42 is shown schematically. The controller 42 may be electronically controlled to regulate the charge to the battery using predefined algorithms suitable for the battery type 44. This comprises a series tuned decoupling controller using a buck regulator for voltage and current control. However, other forms of decoupling controller may be used in place of a series tuned controller and may be more appropriate for particular implementations. Under operation from a single phase supply this would couple voltage 100 into the receiving coil 40 on the electric autocycle. Coil 40 is tuned for resonance at the frequency of the IPT supply with capacitor 102. The output voltage is then rectified using the diode bridge 104 into bridge capacitor 106. The output diode 108, DC inductor 110 and capacitor 112 act to filter the voltage and current to the bike battery 44. Switch 114 is used to regulate the charging current into the battery and the voltage across the battery using a suitable micro-controller which senses battery voltage, current and takes measurements of temperature as required depending on the battery type and chemistry. Control of this charger can be enhanced using suitable communication means to the IPT supply to ensure the integrity of the complete system.

Such a charging system incorporates three levels of isolation from the mains. The first is within the IPT power supply, the second at the magnetic coupler at the base of the interchangeable arm to the intermediate IPT section (allowing changes to be made to an operating system to configure a new bike) and a third at the charging point.

It will be seen that the invention provides considerable advantages. An electric autocycle can be charged using an IPT system where coupling occurs on an area of the frame. This can also facilitate physical support of the autocycle if required, and can provide a locking or securing point to engage the autocycle with the rack or stand in which the primary side of the IPT system is provided. The system can allow a single power supply to charge multiple autocycles, and can allow magnetic field to be provided safely to only those units that are being charged thereby complying with ICNIRP regulations. In particular the apparatus enables the charging arm portion 2 to be removed and replaced easily if required (on failure or for different bike types), while ensuring power is coupled through it to the engagement device 3 when in place. The apparatus also provides means to couple or decouple the system to selectively stop current flow to coil 9 by either mechanical rotation of the arm or use of switches. The system also ensures that there is little or no change in inductance seen by the power supply—particularly when the charging arm portion 2 is connected or disconnected and also when current flow into coil 9 is activated by rotating the arm portion 2 or switching switch 56 closed and switch 54 open.

Where in the foregoing description, reference has been made to specific components or integers of the invention having known equivalents, then such equivalents are herein incorporated as if individually set forth.

Although this invention has been described by way of example and with reference to possible embodiments thereof, it is to be understood that modifications or improvements may be made thereto without departing from the spirit or scope of the invention.

The invention claimed is:

1. Inductive charging apparatus comprising:
    a primary conductor with at least one node for creating a first magnetic field and at least one intermediate resonant circuit, the at least one intermediate resonant circuit comprising:
    a first coil for receiving power from the node;
    a second coil operable in use to be driven by a current in the first coil to generate a second magnetic field for power transfer; and
    a tuning capacitor coupled to the first and second coils for resonance therewith.

2. Electric autocycle support apparatus comprising inductive charging apparatus as claimed in claim 1, comprising:
    an autocycle engagement device adapted to support an autocycle, the engagement device comprising the second coil and whereby the second coil is adapted to provide a magnetic field for inductively charging an autocycle supported by the support apparatus.

3. Apparatus as claimed in claim 2 wherein the support apparatus comprises a support portion and an engagement portion attached to the support portion, the engagement device being provided on the engagement portion.

4. Apparatus as claimed in claim 2 wherein the engagement portion is removably attached to the support portion.

5. Apparatus as claimed in claim 2, wherein the support apparatus is moveable between a first position in which the engagement device is not oriented to support an autocycle and a second position in which the engagement device is oriented to support an autocycle.

6. Apparatus as claimed in claim 5 wherein when the support apparatus is in the first position the second coil does not provide a magnetic field for inductive charging.

7. Apparatus as claimed in claim 2, wherein the apparatus is operable in use such that the coil does not provide a magnetic field for inductive charging when an autocycle is not supported by the support apparatus.

8. Apparatus as claimed in claim 3, wherein the support apparatus is moveable between a first position in which the engagement device is not oriented to support an autocycle and a second position in which the engagement device is oriented to support an autocycle.

9. Apparatus as claimed in claim 4, wherein the support apparatus is moveable between a first position in which the engagement device is not oriented to support an autocycle and a second position in which the engagement device is oriented to support an autocycle.

10. The charging apparatus as claimed in claim 1, further comprising a controller operable in use to control power made available from the resonant circuit.

11. Charging apparatus as claimed in claim 10 wherein the controller comprises a switch whereby actuation of the switch allows the resonant circuit to couple or decouple inductively to or from the primary conductor to thereby receive power inductively from the primary conductor.

12. Charging apparatus as claimed in claim 11 wherein the controller actuates the switch to control the power made available for inductive charging.

13. Charging apparatus as claimed in claim 12 wherein the switch is in parallel with a tuning capacitor of the resonant circuit.

14. Charging apparatus as claimed in claim 10 wherein the controller comprises a magnetic short operable to short a magnetic field provided by the resonant circuit for inductive charging.

15. Charging apparatus as claimed in claim 2 wherein the controller comprises a magnetic short operable to short a magnetic field from the primary conductor.

16. Charging apparatus as claimed in claim 2 wherein the apparatus is operable to charge an electric vehicle.

17. Charging apparatus as claimed in claim 16 wherein the resonant circuit is provided in a housing which is moveable relative to the primary conductor or relative to the electric vehicle and the controller is operable in use to provide a magnetic field available for inductive charging of the electric vehicle dependent on the position of the housing relative to the primary conductor or relative to the electric vehicle.

18. Charging apparatus as claimed in claim 1 wherein the intermediate resonant circuit comprises a tuned LCL circuit.

19. Charging apparatus as claimed in claim 18 wherein the tuned LCL circuit comprises a switch.

20. Charging apparatus as claimed in claim 19 wherein the switch is in series with the first coil or in parallel with the tuning capacitor.

21. Charging apparatus as claimed in claim 19 wherein the switch is configured to control coupling of the tuned LCL circuit to the primary conductor to receive power inductively and make power available inductively for charging.

22. Charging apparatus as claimed in claim 19 wherein actuation of the switch allows the tuned LCL circuit to couple or decouple inductively to or from the primary conductor to thereby receive power inductively from the primary conductor.

23. Charging apparatus as claimed in claim 18 wherein the tuned LCL circuit is adapted to provide a required current in the second coil.

24. Charging apparatus as claimed in claim 18 wherein the tuned LCL circuit is adapted to provide the required current in the second coil from a voltage coupled in the first coil.

25. Charging apparatus as claimed in claim 1 wherein the first coil is adapted to receive power inductively from the primary conductor.

26. Charging apparatus as claimed in claim 1 wherein the second coil is adapted to make power available for inductive charging.

27. Charging apparatus as claimed in claim 1 wherein reactance of the first and second coils and the tuning capacitor is substantially the same.

* * * * *